United States Patent
Little

(10) Patent No.: US 7,124,433 B2
(45) Date of Patent: Oct. 17, 2006

(54) PASSWORD THAT ASSOCIATES SCREEN POSITION INFORMATION WITH SEQUENTIALLY ENTERED CHARACTERS

(75) Inventor: Alex Dudley Little, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 766 days.

(21) Appl. No.: 10/315,347

(22) Filed: Dec. 10, 2002

(65) Prior Publication Data

US 2004/0111646 A1   Jun. 10, 2004

(51) Int. Cl.
G06F 7/04 (2006.01)
G06F 17/30 (2006.01)
G06K 9/00 (2006.01)
H04L 9/32 (2006.01)

(52) U.S. Cl. .............................. 726/2; 726/12; 726/26; 713/182; 713/183

(58) Field of Classification Search ................. 713/182, 713/183; 726/2, 12, 26
See application file for complete search history.

(56) References Cited

U.S. PATENT DOCUMENTS

| | | | | |
|---|---|---|---|---|
| 5,465,084 | A |   | 11/1995 | Cottrell .................. 340/825.31 |
| 5,559,961 | A | * | 9/1996 | Blonder ........................ 726/18 |
| 5,821,933 | A |   | 10/1998 | Keller et al. ................. 345/348 |
| 5,978,919 | A | * | 11/1999 | Doi et al. ...................... 726/36 |
| 6,417,874 | B1 |   | 7/2002 | Bodnar ........................ 345/854 |
| 2001/0044906 | A1 |   | 11/2001 | Kanevsky et al. .......... 713/202 |
| 2002/0029341 | A1 |   | 3/2002 | Juels et al. .................. 713/184 |
| 2002/0083347 | A1 |   | 6/2002 | Taguchi ...................... 713/202 |

FOREIGN PATENT DOCUMENTS

| | | |
|---|---|---|
| JP | 60171560 A | 9/1985 |
| WO | DE19848501 | 10/1998 |
| WO | DE10050734 | 10/2000 |
| WO | FR2819067 | 12/2000 |

OTHER PUBLICATIONS

"Drawing Passwords", IBM Technical Disclosure Bulletin, IBM Corp. New York, vol. 40, No. 5, May 5, 1997, pp. 201-202.
Broussard, S., "Combining the Functionality of Multiple Text Controls in a Graphical User Interface", IBM Patent Application, IBM, Filed May 31, 2001, U.S. Appl. No. 09/870,621.

* cited by examiner

*Primary Examiner*—Jacques Louis-Jacques
*Assistant Examiner*—Jason K. Gee
(74) *Attorney, Agent, or Firm*—David R. Irvin

(57) ABSTRACT

A method that provides high-entropy password protection for electronic devices without requiring the presence of a full keyboard for entering characters or special character-recognition capability. To proffer a password to an electronic device, a user enters a sequence of standard characters on a screen. The device reads the entered sequence, and determines screen position information associated with the entered sequence, according to where the characters are entered on the screen. The entered sequence and the screen position information are compared with a predetermined sequence of characters and predetermined screen position information. If the entered sequence and screen position information match the predetermined sequence and predetermined screen position information, the device accepts the entered sequence as a valid password.

10 Claims, 3 Drawing Sheets

PASSWORD THAT ASSOCIATES SCREEN POSITION INFORMATION WITH SEQUENTIALLY ENTERED CHARACTERS

FIELD OF THE INVENTION

The present invention relates to the field of access control for electronic devices, and more particularly to a method for improving password entropy for electronic devices that have constrained user-input capabilities such as personal digital assistants.

BACKGROUND

Passwords are typically used to ensure that only authorized parties have access to information stored digitally in electronic devices such as personal computers. Password entropy, which is usually specified in information bits, is a measure of the degree of protection provided by passwords. Conventionally, password entropy increases with the number of characters required of a valid password—the longer the password, the more difficult the password is to guess, all other things being equal. Nevertheless, reality imposes a practical limit upon the length of passwords, typically because users cannot remember long strings of random characters very well.

Personal computers are not, of course, the only personal electronic devices that store important information digitally. Miniature devices such as personal digital assistants (PDAs) and enhanced-function wireless telephones are now readily available with the capability of storing vast quantities of information and the capability of providing entry to networks of servers and databases. As a result, these miniature devices now require high-entropy password protection.

Miniature devices, however, are subject to another constraint—they are greatly limited in their capability to accept textual input from their users. Whereas a personal computer normally has a full keyboard to accept the entry of a multi-character, high-entropy password, a PDA or enhanced-function wireless telephone may have only a touch screen display that accepts entries made with a stylus. Users of these devices often find it inconvenient and awkward to enter a multi-digit password. Thus there is a need for a way of providing convenient, high-entropy password protection for miniature devices which do not have full keyboards, such as PDAs and cellular telephones.

SUMMARY

The present invention associates screen position information with character information in a password, thereby increasing the password entropy provided by a given number of standard characters, or conversely, decreasing the number of characters needed to reach a given level of password entropy. Because standard characters are used to specify the inventive password, the character recognition mechanism normally provided for other purposes in miniature electronic devices such as PDAs may be used to read password characters entered on a touch screen display, thereby obviating any need for special characters, images, icons, and the like that are typically associated with visual passwords.

To proffer a password to an electronic device, a user enters a sequence of standard characters on a screen. The device reads the entered sequence, and determines screen position information associated with the entered sequence according to where on the screen the characters are entered. The entered sequence and the screen position information are compared with a predetermined sequence of characters and predetermined screen position information associated with the predetermined sequence. If the entered sequence and screen position information match the predetermined sequence and predetermined screen position information, the device accepts the entered sequence as a valid password.

The invention may be applied usefully to a wide variety of electronic devices, and may be applied especially advantageously to PDA-like devices with touch-screen displays. According to a preferred embodiment of the invention especially suitable for such applications, the touch screen displays a character-entry sector and a plurality of position sectors. For each character of a proffered sequence, the user enters the character freehand in the character-entry sector of the screen with a stylus, and then selects one of the position sectors by touching it with the stylus. In other embodiments, the user may enter characters with a keyboard which may have either a full character set or a limited character set, and may select position sectors using a cursor-moving control such as a mouse, a trackball, a set of four-direction cursor keys, and the like. The device uses the selected position sector as the screen position information of the entered character. The entered sequence and the screen position information are compared with a predetermined sequence and predetermined screen position information. If the entered sequence and screen position information match the predetermined sequence and predetermined screen position information, the device accepts the entered sequence as a valid password.

In another preferred embodiment of the invention, the screen displays a plurality of character-entry sectors. For each character of a proffered sequence, the user selects a character-entry sector and enters the character therein, thus providing implicit screen position information along with the character. The entered sequence and the screen position information are compared with a predetermined sequence and predetermined screen position information. If the entered sequence and screen position information match the predetermined sequence and predetermined screen position information, the device accepts the entered sequence as a valid password.

Thus the present invention provides convenient, high-entropy password protection without requiring the presence of a full keyboard for entering characters, and increases password entropy even when a full keyboard is available. These and other aspects of the invention will be more fully appreciated when considered in light of the following drawings and detailed description.

DETAILED DESCRIPTION

The present invention associates screen-position information with character information in a password, thereby increasing the password entropy provided by a given number of standard characters, or conversely, decreasing the number of characters needed to reach a given level of password entropy.

Here, standard characters are the characters normally available on keyboards, such as alphanumeric characters and commonly used punctuation. More particularly, standard characters have a defined binary representation in an accepted standard such as the American National Standard Code for Information Interchange (ASCII), the Extended Binary Coded Decimal Interchange Code (EBCDIC), or the like.

The use of standard characters enables the use of ordinary character-recognition capabilities in the electronic device protected by the inventive password system. For example, the character recognition mechanism normally provided for other purposes in a miniature electronic device such as a PDA may be used to read password characters entered on a touch screen display, even though these characters may be written freehand with a stylus. This obviates any need for the special mechanisms for recognizing password images, icons, and the like that are required when visual passwords are used.

Figure 1:
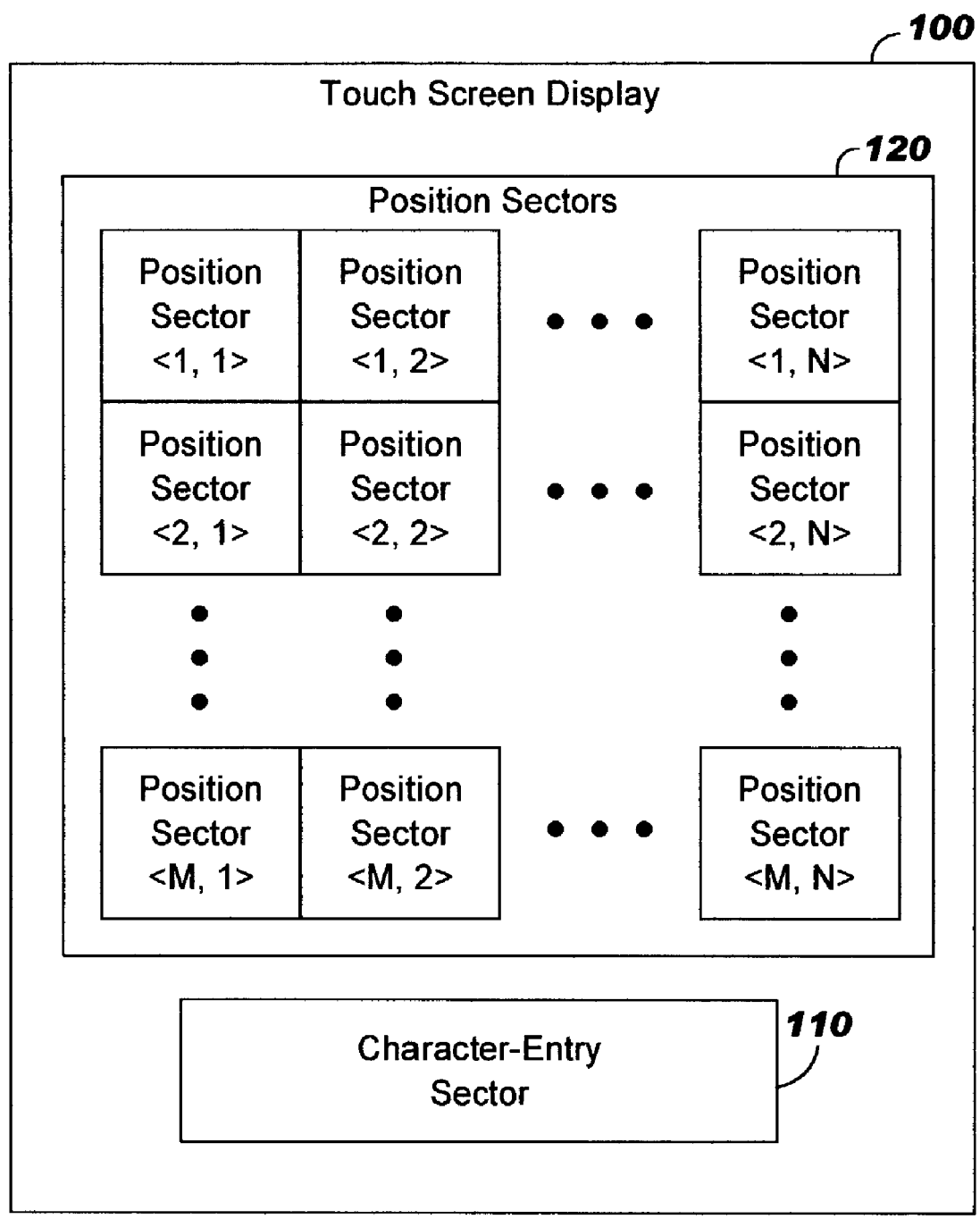
FIG. 1 is a diagram that shows how a screen may be divided into a character-entry sector and a plurality of position sectors, suitable for use with the invention.
Figure 2:
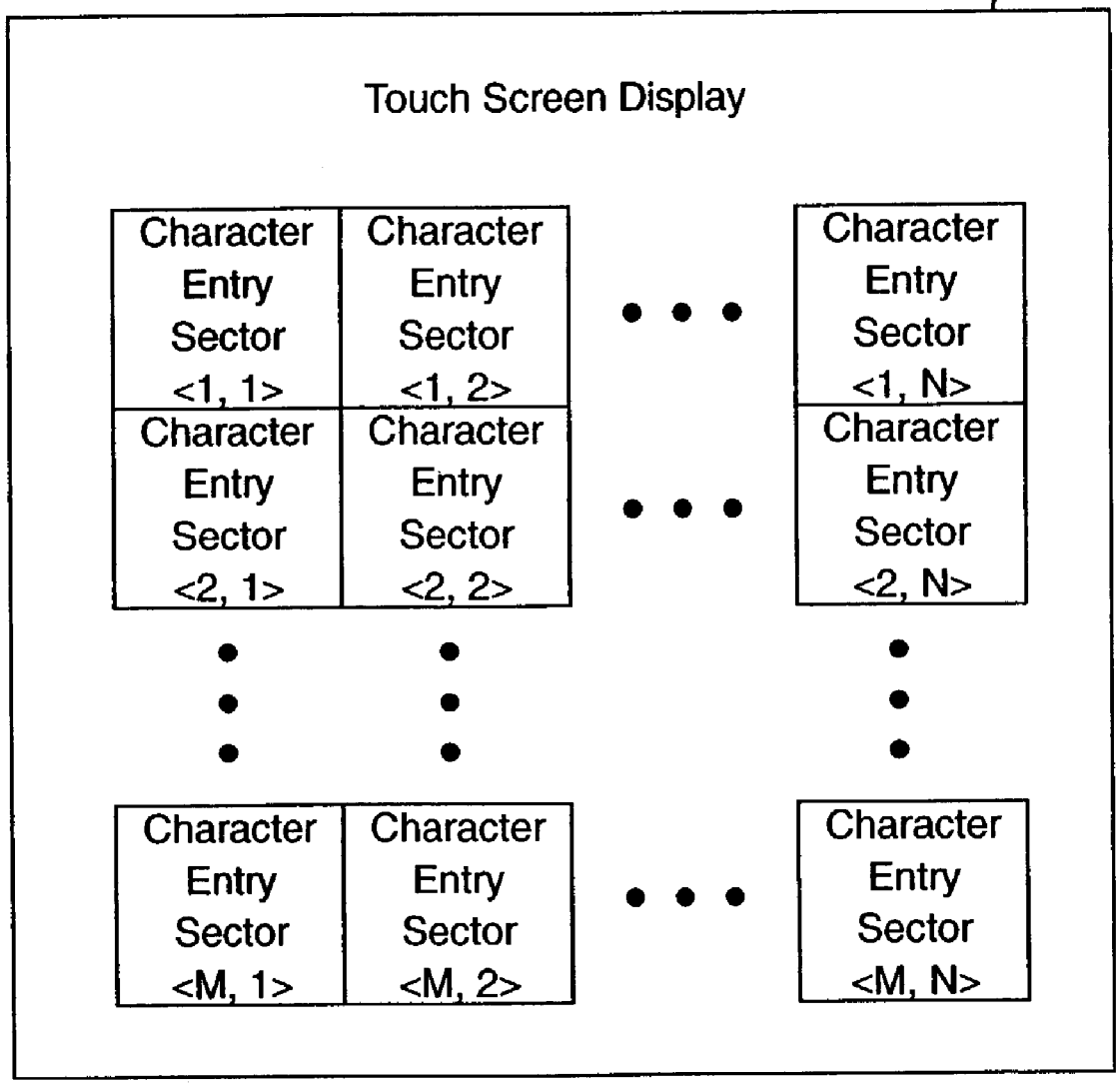
FIG. 2 is a diagram that shows how a screen may be divided into a plurality of character-entry sectors, suitable for use with the invention.

According to the invention, the user proffers a password by entering a sequence of standard characters into a screen displayed by the device. More particularly, FIG. 1 and FIG. 2 show how the screen may be divided into sectors for entering characters and screen-position information. The structural details of these two figures are, of course, exemplary rather than limiting, and those skilled in the art, once taught the present invention, will appreciate that other ways of organizing the screen may be used as well as those shown.

In FIG. 1, the screen 100 is divided into a character-entry sector 110 and a plurality of position sectors 120. Each position sector is identified by an ordered pair of integers denoted generally as <i,j>. The user enters each character of the sequence into the character entry sector 110. Characters may be entered by writing them freehand with a stylus, and thereafter rendering the freehand characters into their ASCII or equivalent representations using the character recognition mechanism of the password-protected device. Alternatively, the screen 100 may display a virtual keyboard in the character-entry sector 110, in which case the user selects characters from the virtual keyboard with a stylus. Alternatively, the user may select the character entry sector with a cursor-moving control such as a mouse, a scroll ball, a set of four-direction cursor keys, or the like, and enter characters into the character entry sector 110 using a keyboard or, equivalently, a limited-function keypad. The position sector may be selected with a stylus, or with a cursor-movement control.

In the above-mentioned embodiments, a position sector is selected for each entered character, thereby associating screen-position information with character information. For example, a user might enter the character X, select position sector <1,2>, enter the character 2, select position sector <1,1>, enter the character T, select position sector <2,2>, enter the character Y, and select position sector <1,2>. In this example, the entered sequence is X2TY, and the associated screen position information is {<1,2>, <1,1>, <2,2>, <1,2>}.

In the embodiment illustrated by FIG. 2, the screen 100 is divided into a plurality of character-entry sectors. Each character entry sector is identified by an ordered pair of integers denoted generally as <i,j>. For each character to be entered, the user selects one of the character-entry sectors, and enters the character into the selected sector. A character may be entered by writing the character freehand with a stylus and thereafter rendering the freehand character into its ASCII or equivalent representation using the character recognition capabilities of the password-protected device. Alternatively, the screen 100 may display virtual keyboards in the character-entry sectors, in which case the user selects the character from the virtual keyboard in the selected character-entry sector with the stylus. Alternatively, the user may select the character-entry sector using a cursor-moving control, and enter the character into the selected sector with a keyboard or limited-function keypad.

In the embodiments discussed above with reference to FIG. 2, screen-position information is associated implicitly with characters according to which character-entry sector a character is entered into. For example, a user might enter the character X in character-entry sector <1,2>, enter the character 2 in character-entry sector <1,1>, enter the character T in character-entry sector <2,2>, and enter the character Y in character-entry sector <1,2>. In this example, the entered sequence is X2TY, and the associated screen position information is {<1,2>, <1,1>, <2,2>, <1,2>}.

In all of the aforementioned illustrative examples and embodiments, characters are entered individually, and each entered character is associated with screen position information. These are not, however, necessary conditions of the invention; rather, they are descriptive conveniences. In other embodiments of the invention, characters may be entered as strings rather than individually, and the strings associated with screen position information. Further, it is not necessary that every character and string be associated with screen position information, only that at least one character or string be associated with screen position information.

Figure 3:
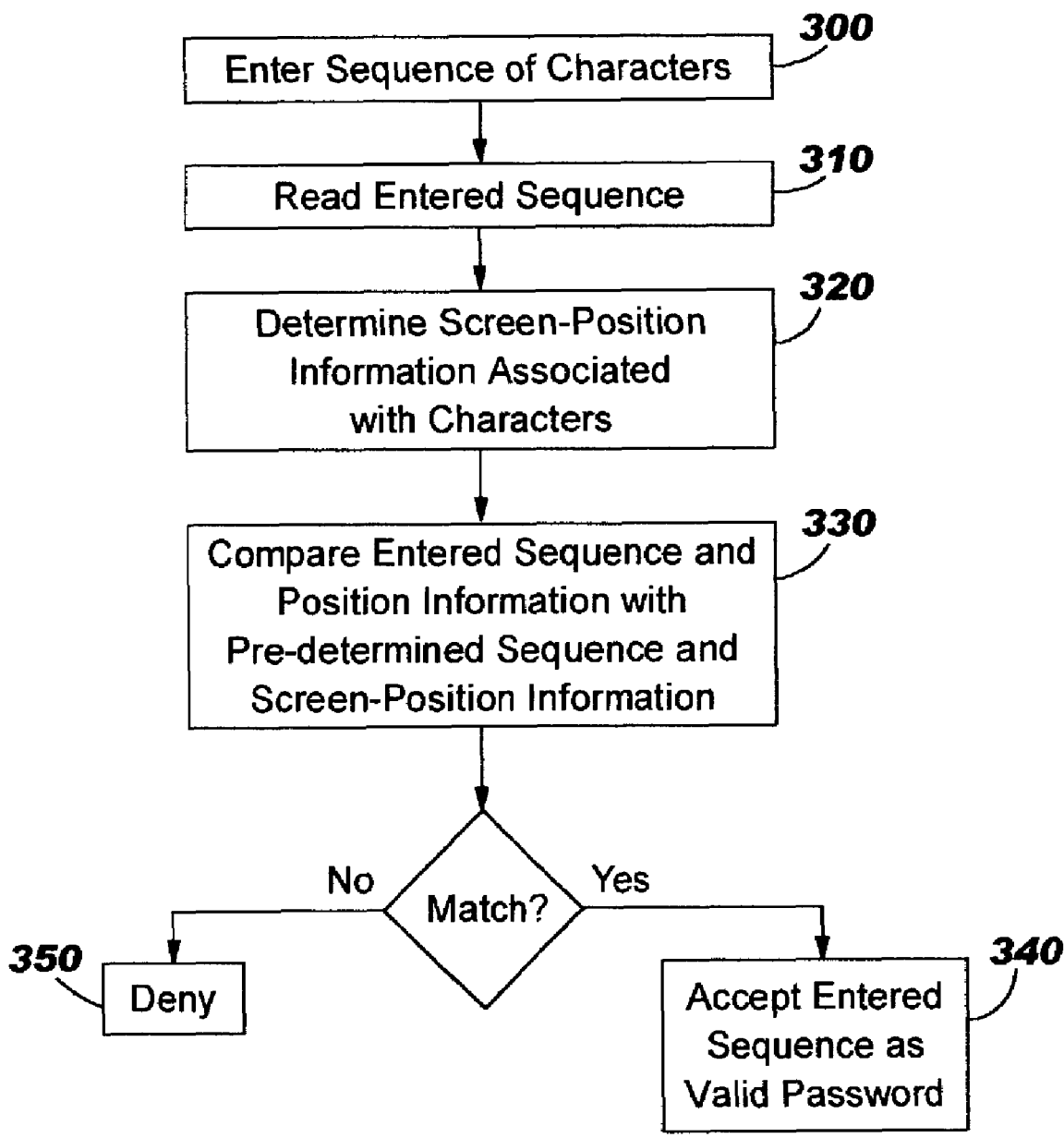
FIG. 3 is a flowchart that shows aspects of the inventive method for determining whether an entered sequence of characters is a valid password, based on screen-position information associated with characters of the entered sequence.

FIG. 3 shows aspects of the inventive method for determining whether an entered sequence of standard characters is a valid password, based on screen position information associated with characters of the entered sequence. As shown in FIG. 3, the user proffers a password by entering a sequence of characters on the screen 100 (step 300), as described above with reference to FIG. 1 and FIG. 2. The protected device reads the entered sequence (step 310), and determines the screen position information associated with the characters, as described above (step 320). The protected device then compares the entered sequence of characters and the associated screen position information with a predetermined sequence of characters and predetermined screen position information associated with the predetermined sequence of characters (step 330), which predetermined characters and predetermined position information may be stored in memory of the protected device. If the entered sequence and screen position information match the predetermined sequence and predetermined screen position information, the protected device accepts the proffered password as valid, and permits the user to access the protected device (step 340). Otherwise (i.e., the entered sequence and screen position information do not match the predetermined sequence and predetermined screen position information), the protected device denies access to the user (step 350).

To understand the degree of improvement provided by the present invention for randomly chosen passwords (i.e., equiprobable likelihood of occurrence), consider first a standard password having N characters, where the characters are from an alphabet that has A symbols. In this case, password entropy is $\log(A^{}N)$, where the logarithm is base-2. Thus a six-character conventional password, where the characters are alphanumeric and therefore taken from a 36-character alphabet, has a password entropy of approximately 31 bits. Now suppose that each symbol of the alphabet may be associated with B possible screen positions, as taught by the invention. In this case, password entropy is log((AB)N). Now, a four-character inventive password, from a 36-character alphabet, with nine possible screen positions, has a password entropy of approximately 34 bits. Thus, in this example, the invention has given a four-character password greater entropy than a conventional six-character password.

From the foregoing description, those skilled in the art will now appreciate that the present invention provides convenient, high-entropy password protection without requiring the presence of a either a full keyboard for entering characters or special character-recognition capability, and increases password entropy even when a full keyboard is available. The foregoing description is illustrative rather than limiting, however, and the invention is limited only by the claims that follow.

I claim:

1. A method for determining whether an entered sequence of standard characters is a valid password, suitable for controlling access to an electronic device, said method comprising the steps of:
   reading a sequence of standard characters entered by a user into a character entry sector of a screen;
   for each character of the entered sequence, determining screen-position information associated with the character by reading input that identifies a sector of the screen that is different from the character entry sector, said identified sector being identified by the user, and associating the identified sector with the character as screen-position information;
   comparing the entered sequence and the screen-position information with a predetermined sequence of characters and predetermined screen-position information associated with the predetermined sequence of characters; and
   accepting the entered sequence as a valid password and unlocking the electronic device if the entered sequence and the screen-position information match the predetermined sequence of characters and the predetermined screen-position information.

2. The method of claim 1, wherein the characters are entered on the screen with a stylus.

3. The method of claim 1, wherein the characters are entered on the screen with a keyboard.

4. The method of claim 1, wherein the step of determining screen position information includes the step of identifying a sector of the screen touched with a stylus.

5. The method of claim 1, wherein the step of determining screen position information includes the step of identifying a sector of the screen located with a cursor-moving control.

6. A program storage device readable by a machine, tangibly embodying a program of instructions executable by the machine to perform method steps for determining whether an entered sequence of standard characters is a valid password, suitable for controlling access to an electronic device, said method steps comprising:
   reading a sequence of standard characters entered by a user into a character entry sector of a screen;
   for each character of the entered sequence, determining screen-position information associated with the character by reading input that identifies a sector of the screen that is different from the character entry sector, said identified sector being identified by the user, and associating the identified sector with the character as screen-position information;
   comparing the entered sequence and the screen-position information with a predetermined sequence of characters and predetermined screen-position information associated with the predetermined sequence of characters; and
   accepting the entered sequence as a valid password and unlocking the electronic device if the entered sequence and the screen-position information match the predetermined sequence of characters and the predetermined screen-position information.

7. The program storage device of claim 6, wherein the characters are entered on the screen with a stylus.

8. The program storage device of claim 6, wherein the characters are entered on the screen with a keyboard.

9. The program storage device of claim 6, wherein the step of determining screen-position information includes the step of identifying a sector of the screen touched with a stylus.

10. The program storage device of claim 6, wherein the step of determining screen position information includes the step of identifying a sector of the screen located with a cursor-moving control.

* * * * *